United States Patent
Cohen et al.

(10) Patent No.: US 10,929,716 B2
(45) Date of Patent: Feb. 23, 2021

(54) SYSTEM AND METHOD FOR LABEL-FREE IDENTIFICATION AND CLASSIFICATION OF BIOLOGICAL SAMPLES

(71) Applicant: Molecular Devices LLC, San Jose, CA (US)

(72) Inventors: Avrum Cohen, Downingtown, PA (US); Dihui Hong, Chester Springs, PA (US); Stephen M. Rhein, Phoenixville, PA (US)

(73) Assignee: Molecular Devices, LLC, San Jose, CA (US)

( * ) Notice: Subject to any disclaimer, the term of this patent is extended or adjusted under 35 U.S.C. 154(b) by 134 days.

(21) Appl. No.: 16/128,798

(22) Filed: Sep. 12, 2018

(65) Prior Publication Data
US 2020/0082222 A1 Mar. 12, 2020

(51) Int. Cl.
*G06K 9/00* (2006.01)
*G06K 9/62* (2006.01)
(Continued)

(52) U.S. Cl.
CPC ....... *G06K 9/6259* (2013.01); *G06K 9/00134* (2013.01); *G06K 9/00147* (2013.01);
(Continued)

(58) Field of Classification Search
CPC . G06T 2207/10064; G06T 2207/30242; G06T 2207/20081; G06T 2207/20084;
(Continued)

(56) References Cited

U.S. PATENT DOCUMENTS

2003/0018457 A1* 1/2003 Lett .................. G06T 5/002
703/11
2017/0052106 A1* 2/2017 Hennig .............. G06K 9/00147
(Continued)

OTHER PUBLICATIONS

Ounkomol et al., "Label-free prediction of three-dimensional fluorescence images from transmitted-light microscopy", https://europepmc.org/articles/pmc6212323;Published in final edited form as:Nat Methods. Nov. 2018 ; 15(11): 917-920. doi:10.1038/s41592-018-0111-2.*
(Continued)

*Primary Examiner* — Charles T Shedrick
(74) *Attorney, Agent, or Firm* — McCracken & Gillen LLC (57) ABSTRACT

A system and method of analyzing a biological sample using an imaging system are disclosed. An image acquisition module instructs the imaging system to obtain a label free image of a training biological sample and in response receives a first training image. The image acquisition module also instructs the imaging system to cause the training biological sample to fluoresce and obtain an image of the training biological sample undergoing fluorescence, and in response receives a second training image. An analysis module analyzing the second training image to generate a plurality of training cell characteristics, wherein each of the plurality training cell characteristics is associated with one of a plurality of training cells that comprise the training biological sample. A training module trains a machine learning system using the first training image and the plurality of training cell characteristics to develop a trained machine learning system such that when the trained machine learning system is operated with the first training image as an input, the trained machine learning system generates a plurality of predicted cell characteristics that correspond to the plurality of training cell characteristics.

20 Claims, 7 Drawing Sheets

(51) Int. Cl.
  *G06N 3/08*    (2006.01)
  *G06N 3/04*    (2006.01)
  *H04N 5/232*   (2006.01)
  *G06T 7/12*    (2017.01)
(52) U.S. Cl.
  CPC .............. *G06N 3/04* (2013.01); *G06N 3/08*
       (2013.01); *H04N 5/232* (2013.01); *G06K*
       *9/6262* (2013.01); *G06T 7/12* (2017.01); *G06T*
       *2207/10064* (2013.01); *G06T 2207/20076*
       (2013.01); *G06T 2207/20081* (2013.01); *G06T*
       *2207/20084* (2013.01); *G06T 2207/30024*
       (2013.01); *G06T 2207/30242* (2013.01)
(58) Field of Classification Search
  CPC . G06T 2207/30024; G06T 2207/20076; G06T
       7/12; G06K 9/00134; G06K 9/6259;
       G06K 9/00147; G06K 9/6262; G06N
       3/04; G06N 3/08; H04N 5/232
  See application file for complete search history.

(56) References Cited

U.S. PATENT DOCUMENTS

2019/0384047 A1\* 12/2019 Johnson ............... G06K 9/3233
2020/0026057 A1\*  1/2020 Krueger ............... G06K 9/6289
2020/0050830 A1\*  2/2020 Krueger ............... G06K 9/6256

OTHER PUBLICATIONS

Google AI Blog, "Seeing More with In Silico Labeling of Microscopy Images", Apr. 12, 2018, Eric Christiansen, Senior Software Engineer, Google Research http://ai.googleblog.com/2018/04/seeing-more-with-in-silico-labeling-of.html>.

Christiansen et al., In Silico Labeling: Prediction Flurescent Labels in Unlabeled Images, 2018, Cell 173, 1-12 Apr. 19, 2018 2018 Elsevier Inc.

\* cited by examiner

SYSTEM AND METHOD FOR LABEL-FREE IDENTIFICATION AND CLASSIFICATION OF BIOLOGICAL SAMPLES

FIELD OF DISCLOSURE

The present subject matter relates to a system and method for label-free identification and classification of biological samples and more particularly, to identification and classification of biological samples using a supervised machine learning system.

BACKGROUND

An imaging system such as a high content imaging system may be used to capture one or more images of a biological sample. Thereafter, the image(s) is/are analyzed to obtain metrics associated with the biological sample. These metrics include, for example, a number of different types of cells in the biological sample, the number of cells of each type, a proportion of living cells to dead cells, and the like.

The imaging system includes one or more illumination sources, one or more objective lenses, and an image capture device such as a charge-coupled device or a complementary metal-oxide-semiconductor (CMOS) device to produce magnified images of the biological sample. The illumination source may include a laser or other light source that directs light through the biological sample when the biological sample is not undergoing fluorescence, and the light transmitted through the biological sample is imaged by the image capture device. The image of the non-fluorescent biological sample captured by the image capture device is referred herein as a label free image and may be, for example, a transmitted light image, a phase contrast image, differential interference contrast image, and the like. As would be apparent to one of ordinary skill in the art, these different types of label free images are transmitted light images captured under different illumination conditions (e.g., with polarized light, light of particular wavelengths, etc.) and/or using different types of filters between the light source and the image capture device.

In some applications, the biological sample may be stained (or labeled) using one or more fluorescent dye(s), each of which adheres to one or more particular protein(s) or component(s) in the biological sample. The illumination source is used to expose the labeled biological sample to light having particular characteristic(s) (e.g., a particular wavelength) that causes the fluorescent dye to fluoresce, and the light emitted by such fluorescence is then captured by the image capture device. Compared to the transmitted or reflected images of unlabeled biological samples, images of the fluorescence of the biological labeled with the dye more clearly distinguish those elements (e.g., proteins and organelles) associated with the fluorescence from other parts of the biological sample. Thus, more accurate metrics regarding such elements may be developed from the image of the biological sample undergoing fluorescence.

However, labeling a biological sample with one or more fluorescent dyes is time consuming. Further, certain fluorescent dyes may be harmful, and even toxic, to biological samples. For at least these reasons, developing images of labeled biological samples undergoing fluorescence is not feasible or desirable in certain situations.

It would be useful to obtain the analysis advantages provided by imaging biological samples under fluorescence using only transmitted light images.

SUMMARY

According to one aspect, a method of analyzing a biological sample using an imaging system includes the step of causing a non-transitory programmable device to undertake the steps of instructing the imaging system to obtain a label free image of a training biological sample and in response receiving a first training image, and instructing the imaging system to cause the training biological sample to fluoresce and obtain an image of the training biological sample undergoing fluorescence, and in response receiving a second training image. The non-transitory programmable device is caused to undertake the additional steps of analyzing the second training image to generate a plurality of training cell characteristics, and training a machine learning system using the first training image and the plurality of training cell characteristics to develop a trained machine learning system such that when the trained machine learning system is operated with the first training image as an input, the trained machine learning system generates a plurality of predicted cell characteristics that correspond to the plurality of training cell characteristics. Each of the plurality training cell characteristics is associated with one of a plurality of training cells that comprise the training biological sample.

According to another aspect, a system for analyzing a biological sample using an imaging system includes a machine learning system, an image acquisition module, an analysis module, and a training module. The image acquisition module operates on a non-transitory programmable device and instructs the imaging system to generate a label free image of a training biological sample and in response receives a first training image, and instructs the imaging system to cause the training biological sample to fluoresce and obtain an image of the training biological sample undergoing fluorescence, and in response receives a second training image. The analysis module operates on the non-transitory programmable device and analyzes the second training image to generate a plurality of training cell characteristics, wherein each of the plurality training cell characteristics is associated with one of a plurality of training cells that comprise the training biological sample. The training module operates on the non-transitory programmable device and trains the machine learning system using the first training image and the plurality of training cell characteristics to develop a trained machine learning system such that when the trained machine learning system is operated with the first training image as an input, the trained machine learning system generates a plurality of predicted cell characteristics that correspond to the plurality of training cell characteristics.

Other aspects and advantages will become apparent upon consideration of the following detailed description and the attached drawings wherein like numerals designate like structures throughout the specification.

DETAILED DESCRIPTION

In some applications, to facilitate analysis of a biological sample, a label free (i.e., transmitted light) or fluorescent image of the biological sample may be processed to generate a segmented image. In such applications, each pixel of the segmented image corresponds to a pixel of the transmitted light or fluorescent image of the biological sample. A value of each pixel of the segmented image indicates whether a corresponding pixel of the transmitted light or fluorescent image is associated with an element of the biological sample that is of interest to a researcher. Such element may include for example, a cell interior, an organelle, a protein, a cell wall, and the like. Because the fluorescent image more clearly distinguishes between elements of the biological sample, a more accurate segmented image may be produced from the fluorescent image.

Further, in other applications, as noted above, a fluorescent image of the biological sample may be more readily analyzed to identify cells thereof that have a particular characteristic (e.g., presence of a particular protein, whether the cell is alive or dead, etc.) because, for example, the presence of such characteristics causes fluorescence that is captured in the fluorescent image.

However, as noted above, obtaining a fluorescent image of a biological sample may not always be feasible or desirable. As described in detail below, a training biological sample may be imaged using transmitted light and under fluorescence to create a training label free and a training fluorescent image, respectively. The training fluorescent image may be processed to create a segmented image. A machine learning system may then be trained to create the segmented image from the training label free image. After training, when the machine learning system trained in this manner is presented with a label free image of a further biological sample as an input, the trained machine learning system produces a segmented image without the need for a fluorescent image of the further biological sample.

Similarly, in some cases, the training fluorescent image is processed to develop a training characteristic value that indicates the presence of a particular characteristic in the biological sample represented in the training fluorescent image. The training label free image and the training characteristic value are used to train the machine learning system so that when the machine learning system is presented with a label free image, the machine learning system generates a characteristic value that indicates the presence of the characteristic.

Figure 1:
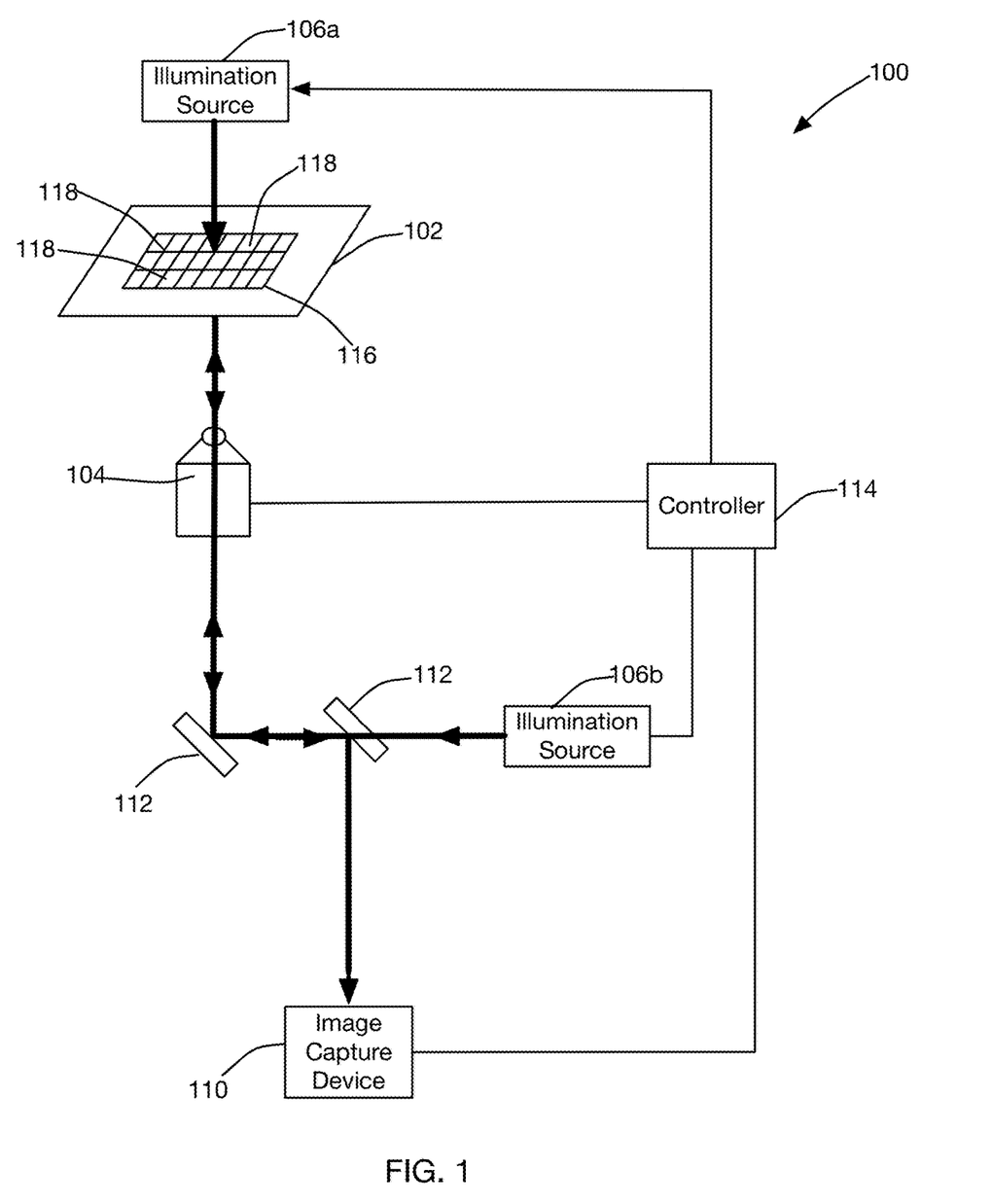
FIG. 1 is a block diagram of an imaging system.
Figure 2:
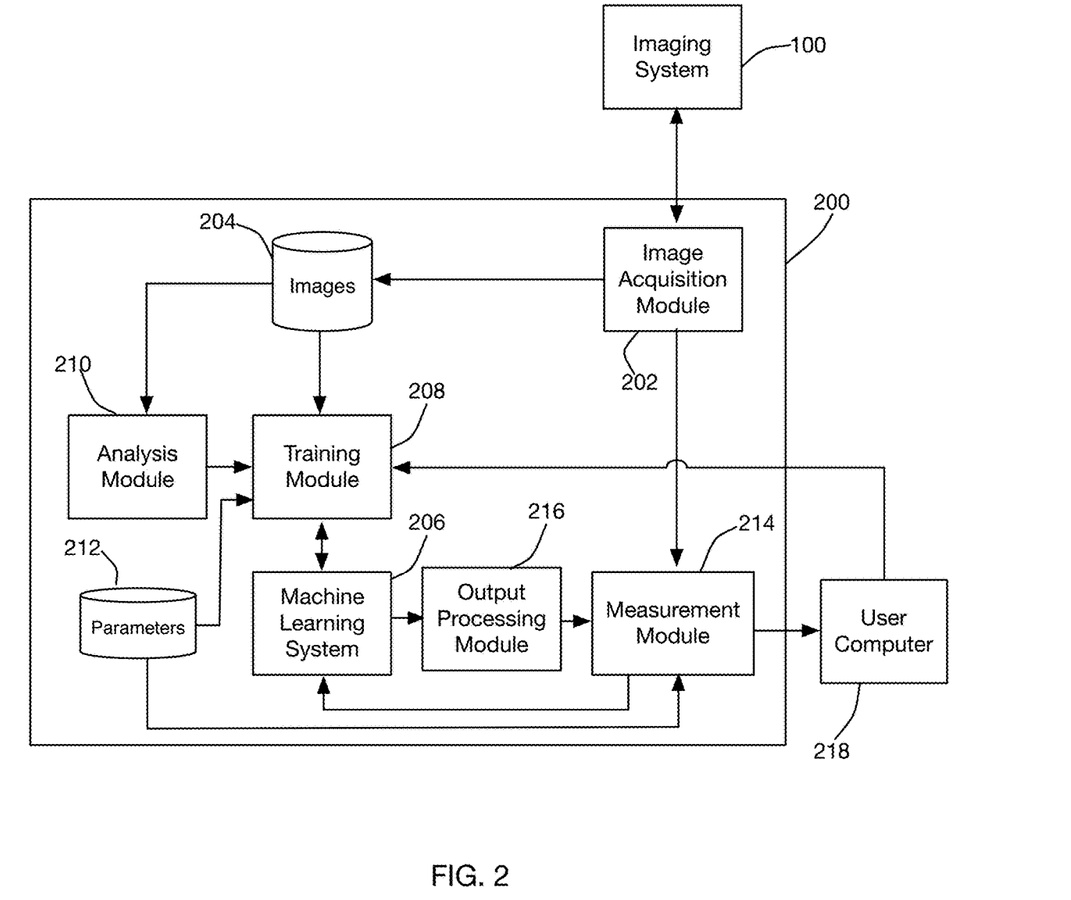
FIG. 2 is a block diagram of a training and analysis system.

Referring to FIGS. 1 and 2, an imaging system 100 is used by a training and analysis system 200 to obtain label free images and fluorescent images of one or more biological sample(s). In some embodiments, such imaging system 100 includes an X-Y stage 102, one or more objective lenses 104, an image capture device 110, one or more mirrors 112, and a controller 114. For sake of clarity, other components of the imaging device 100 may include such as a focus mechanism, one or more filters, a plurality of objective lenses from which the objective lens 104 is selected, and the like are not shown in FIG. 1.

During operation of the imaging system 100, a biological sample carrier 116 such as, for example, a microplate, is disposed on the X-Y stage 102 either manually or robotically. The sample carrier 116 may include a plurality of wells 118 and a biological sample may be disposed each such well 118, wherein each biological sample includes, for example, one or more cells or portions thereof.

The controller 114 operates the X-Y stage 102 so that a selected well 118 or a portion thereof is in the field of view of the imaging device 110. The controller 114 then operates the illumination source 106a to illuminate the selected well 118 with particular wavelengths of light and actuates the image capture device 110 so that light from the illumination source 106a that is not absorbed or reflected by the biological sample disposed in the selected well 118 is transmitted through the biological sample, through the objective lens 104, and is recorded by the image capture device 110 as an image.

If the biological sample is fluorescent (either naturally or by being labeled with a fluorescent dye), the controller 114 operates the illumination source 106b to generate light that causes the biological sample to fluoresce, and light emitted by such fluorescence is transmitted through the objective lens 104 and is recorded by the image capture device 110 as an image.

One or more mirror(s) 112 (e.g., a semi-transparent, a two-way, and/or dichromic mirror) is/are disposed in the light path between the illumination source 106b and the sample tray 116 and between the sample tray 116 and the image capture device 110 to direct the light from the illumination source 106b to the sample tray 116 and from the sample tray 116 to the image capture device 110, respectively.

The controller repeatedly operates the X-Y stage 102, the illumination source 106, and the image capture device 110 in this manner until images have been captured of all of the wells 118 of the sample tray 116 that are of interest. Further, the controller 114 may capture several images of the same well 118 or portions thereof, when each such image is captured under different illumination conditions and/or with different combinations of objective lenses 104 and filters (not shown). By controlling the illumination conditions, a first image may be captured when the biological sample is not undergoing fluorescence and a second image may be captured when the same biological sample is undergoing fluorescence. Such images may be captured in alignment so that a pixel at each coordinate of the first image and a pixel of the second image at the same coordinate of the second image correspond to a substantially identical portion of the biological sample.

Although the embodiments described herein refer to the use of a multi-well sample carrier 116, it should be apparent to one having ordinary skill in the art, that a single well carrier or a microscopy slide may be used in connection with these embodiments. Similarly, although these embodiments contemplate the use of X-Y stage automatically moveable by the controller 114 to capture images of various portions of the sample carrier 116, it should be apparent that the X-Y state may be manually moved by an operator (for example, as is done when using a conventional microscope).

Although FIG. 1 shows the sample tray 116 disposed between the illumination source 106 and the image capture 110, it should be apparent to those of who have skill in the art that the illumination source 106 may be disposed between the image capture device 110 and the sample tray 116. In such embodiments, light from the illumination source 106 reflected by the biological sample or generated by fluorescence of the biological sample is directed using one or more mirrors (not shown) through the objective lens 104 and captured by the image capture device 110.

Further, although the embodiments herein describe the use of a lens-based imaging system 100, it should be apparent to one having ordinary skill in the art that images captured using a lens-free imaging system may be used in connection with such embodiments.

As described in greater detail below, imaging system 100 may be operated as described above to provide to the training and analysis system 200 label free images of biological samples disposed in the sample tray 116 and images of such biological samples under fluorescence. The images of the biological samples under fluorescence may be analyzed to identify cells (or portions thereof) of the biological sample in such images that exhibit a particular characteristic. Such cells identified as being associated with the particular characteristic and the transmitted light images may be used to train a machine learning system 206, for example, a neural network or another deep learning system. After training, in response to an input transmitted light image, the machine learning system 206 produces a plurality of characteristic predictions. In some embodiments, each such characteristic prediction is associated with a corresponding pixel in the input image and the value of such characteristic prediction indicates a probability that such pixel is associated with the particular characteristic. For example, if the machine learning system 206 is trained to identify pixels associated with live cells in an input image that includes both live and dead cells, the value of each characteristic prediction generated by the machine learning system 206 indicates the probability that the corresponding pixel in the input image (and thus the portion of the biological sample represented by such pixel) is associated with a live cell. In such embodiments, the machine learning system 206 may be used to, for example, segment an input image based in accordance with the types of cell(s) or characteristic(s) of cells present in the image.

In other embodiments, the machine learning system 206 may be trained to analyze an image to determine if the image represents a particular type of cell or a cell having a particular characteristic. In such embodiments, when the machine learning system 206 trained in this manner is provided an image as an input, the machine learning system 206 generates an output that is a value that represents a probability that the image provided as input includes a cell of the particular type or having the particular characteristic. In these embodiments, the machine learning system 206 may be used to, for example, classify a cell represented by an image. An image having a plurality of cells represented therein may be tiled into sub-images of either adjacent tiles or overlapping tiles, wherein each sub-image has dimensions associated with a single cell. Such sub-image may then be presented to the trained machine learning system as an input, and the output of the trained machine learning system indicates the probability that the sub-image includes a cell of the particular type or having the particular characteristics.

As shown in FIGS. 1 and 2, in addition to the machine learning system 206, the training and analysis system 200 includes an image acquisition module 202 and an image store 204 in which such images may be stored. In some embodiments, the image acquisition module 202 interfaces with the controller 114 to direct the imaging system 100 to capture one or more image(s) and provide such captured image(s) to the image acquisition module 202. In some embodiments, the image acquisition module 202 instructs the controller 114 to configure the imaging system 100 to capture a transmitted light image or a fluorescent image using, for example, particular illuminant(s), objective lens(es), filter(s), and the like.

The image acquisition module 202 obtains training label free and training fluorescent images of training biological samples from the imaging system 100. The training label free and training fluorescent images are label free and fluorescent images, respectively, that are used to train the machine learning system 206. As described in greater detail below, a training module 208 uses the training label free and training fluorescent images obtained by the image acquisition module 202 from the imaging system 100 and cell characteristics information associated with such images developed by an image analysis module 210 to train the machine learning system 206. After the machine learning system 206 is trained, parameters associated with each node of the machine learning system 206 developed during such training such as activation values, scaling factors, kernel weights, and the like are stored in a parameters data store 212. After training, the image acquisition module 202 obtains further images of further biological samples, and a measurement module 214 configures the machine learning system 206 with parameters stored in the parameters data store 212 and operates the configured machine learning system 206 to analyze the further images to measure characteristics of the further biological samples. In some embodiments, the output generated by the machine learning system 206 may be processed by an output processing module 216 that thresholds, removes spurious values, and/or otherwise cleanses such output before such cleansed output is processed by the measurement module 214.

Figure 3:
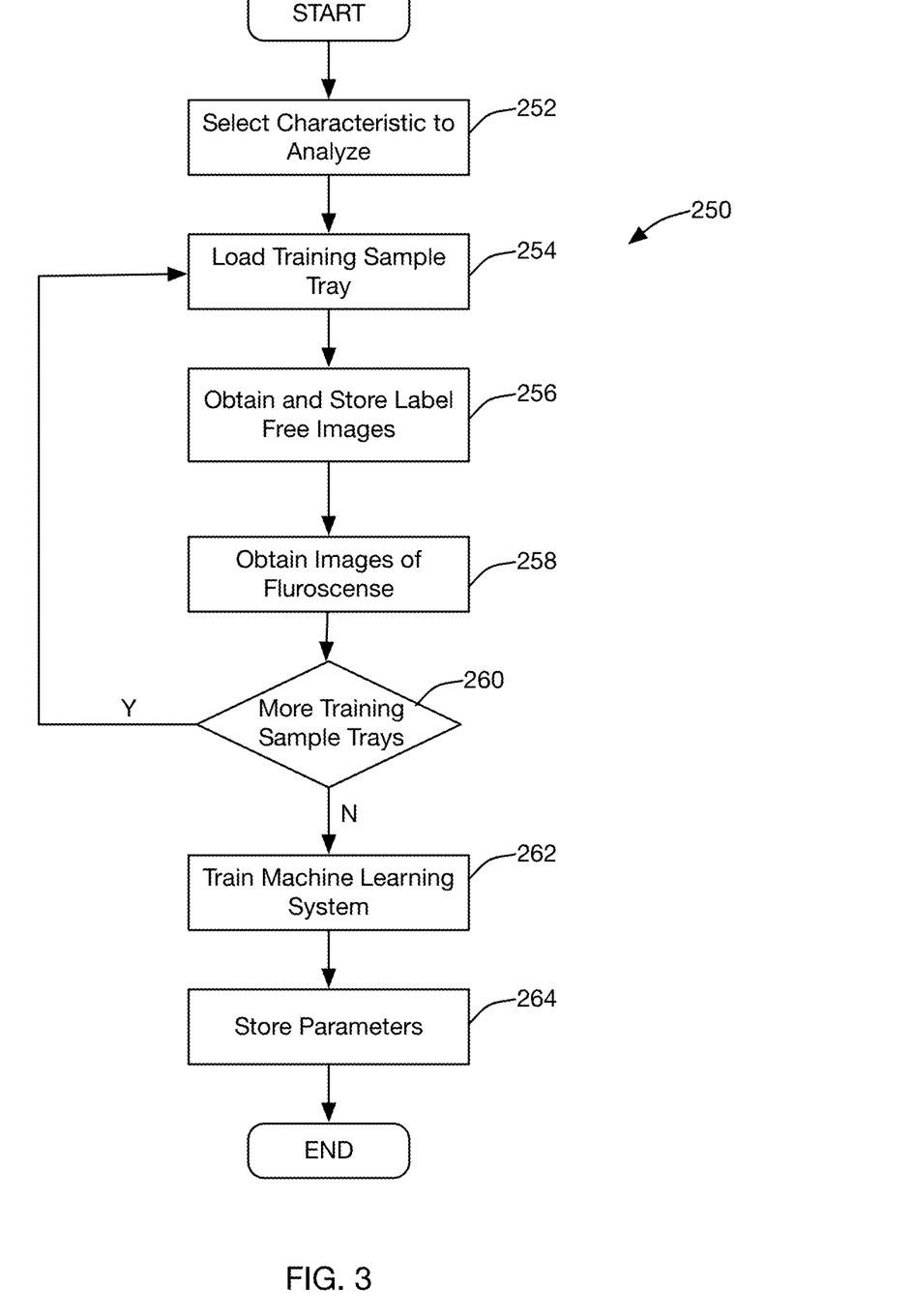
FIG. 3 is a flowchart of the steps undertaken by the training and analysis system of FIG. 2 to train a machine learning system thereof.

FIG. 3 is a flowchart 250 of the steps undertaken to train the machine learning system 206. Referring to FIGS. 1-3, at step 252 a user operates a user computer 218 to specify to the training module a cell characteristic to train the machine learning system 206 to identify from input images. Such characteristics include the presence of, for example, live cells, dead cells, a particular protein or compound, a particular organelle, and the like. In some embodiments, the user also specifies, using the user computer 218, a type of biological sample (e.g., neural cells, animal cells, etc.) in which the machine learning system 206 is to be trained to identify the characteristic.

Thereafter, at step 254, a training sample tray 116 that has a biological sample deposited into one or more well(s) 118 thereof is either manually or robotically loaded onto the X-Y stage 102 of the imaging system 100. Each biological sample(s) deposited into such well(s) 118 is stained or otherwise treated with a fluorescent dye associated with the characteristic.

After the training sample tray 116 is loaded, the image acquisition module 202, at step 256, directs the imaging system 100 to capture a transmitted light image of each biological sample deposited in the well(s) 118 of the sample tray 116. In response, the controller 114 repeatedly operates the X-Y stage 102 to position a well 118 (or a portion thereof) in the light path between the illumination source 106 and the objective lens 104, actuates the illumination source 106 and the image capture device 110 to capture transmitted light image of the well 118 (or portion thereof), and transmits the captured image to image acquisition module 202. The controller 114 operates the X-Y stage 102, the illumination source, and the image capture device 110 in this manner until transmitted light images of all of the wells 118 of the sample tray (or the wells 118 that have a biological sample deposited therein) have been captured and sent to the image acquisition module 202.

Also, at step 256, the image acquisition module 202 receives each transmitted light image captured as describe above and stores such transmitted light image as a training transmitted light image in the image data store 204.

At step 258, the image acquisition module 202 instructs the controller 114 of the imaging system 100 to cause the biological sample (or dye affixed thereto) to fluoresce and capture an image of the biological sample during such fluorescence. In response, the controller 114 operates the X-Y stage 102 to position the well 118 (or a portion thereof) in the light path between the illumination source 106 and the objective lens 104. Thereafter, the controller 114 actuates the illumination source 106 to emit light that has one or more particular wavelength(s) selected to cause the fluorescent dye or the biological sample to fluoresce, operates the image capture device 110 to capture an image of the biological sample during fluorescence, and transmits the captured image to the image acquisition module 202.

In some embodiments, the image acquisition module 202 specifies to the controller 114 the wavelength(s) of light the illumination source 106 should emit to cause fluorescence of the biological sample and/or fluorescent dye. In these cases, the image acquisition module 202 selects these wavelengths in accordance with the characteristic and/or biological sample type specified by the user at step 252. In other embodiments, the image acquisition module 202 provides, either at or prior to step 258, the characteristic and/or the biological sample type to the controller 114 and the controller 114 selects the wavelength(s) of light with which to illuminate the biological sample.

Also, at step 258, the image acquisition module 202 stores each image of the biological sample during fluorescence received thereby in the image data store 204 as a training fluorescent image.

One or more training fluorescent image is captured for each training transmitted light image. Further, each pixel of the training fluorescent image corresponds to a pixel of the training transmitted light image, and these pixels represent the intensity of light transmitted through or fluoresced by a substantially identical portion of the biological sample.

Although the steps 256 and 258 specify capturing transmitted light images of the wells 118 of the sample tray 116 and then capturing fluorescent images of the wells 118, it should be apparent that the controller 114 may operate the X-Y stage 102 to position a well 118 in the light path between the illumination source 106 and the image capture device 110, and operate the illumination source 106 and image capture device 110 to sequentially capture a transmitted light and fluorescent images of such well. Thereafter, the controller 114 may operate the X-Y stage 102 to position another portion of the well 118 or another well 118 in the light path between the illumination source 106 and the image capture device 110 and capture transmitted light and fluorescent images thereof repeatedly until all of the wells 118 of the sample training tray 116 that have biological samples deposited therein have been imaged in this manner. Each captured image may be transmitted to the image acquisition module 202 as it is acquired, or all of the captured images may be transmitted in bulk after all such images have been acquired.

Returning to FIG. 3, at step 260 the training module 208 determines if there are additional training sample trays to be imaged, for example, by querying the user via the user computer 218. If there are additional training sample trays, processing proceeds to step 254.

Otherwise, at step 262 the training module uses the training transmitted light and the training fluorescent images to train the machine learning system 206, as described in greater detail below. After training of the machine learning system 206 is complete, at step 264, the parameters associated with each node of the machine learning system 206 are stored in the parameters data store 212. Such parameters include, for example, activation thresholds, input and output scaling factors or weights, convolution kernels, the architecture of machine learning system 206. For example, if the machine learning system 206 is a neural network, the architecture of the nodes or neurons in each layer, interconnections between node layers, and the like are stored in the parameters data store 212. As should be apparent to one who has ordinary skill in the art, such neural network may include interconnections of one or more convolution layers and one or more neuron layers with one or more pooling layers therebetween. The parameters that are stored are sufficient to configure an untrained machine learning system 206 to a trained state.

Figure 4:
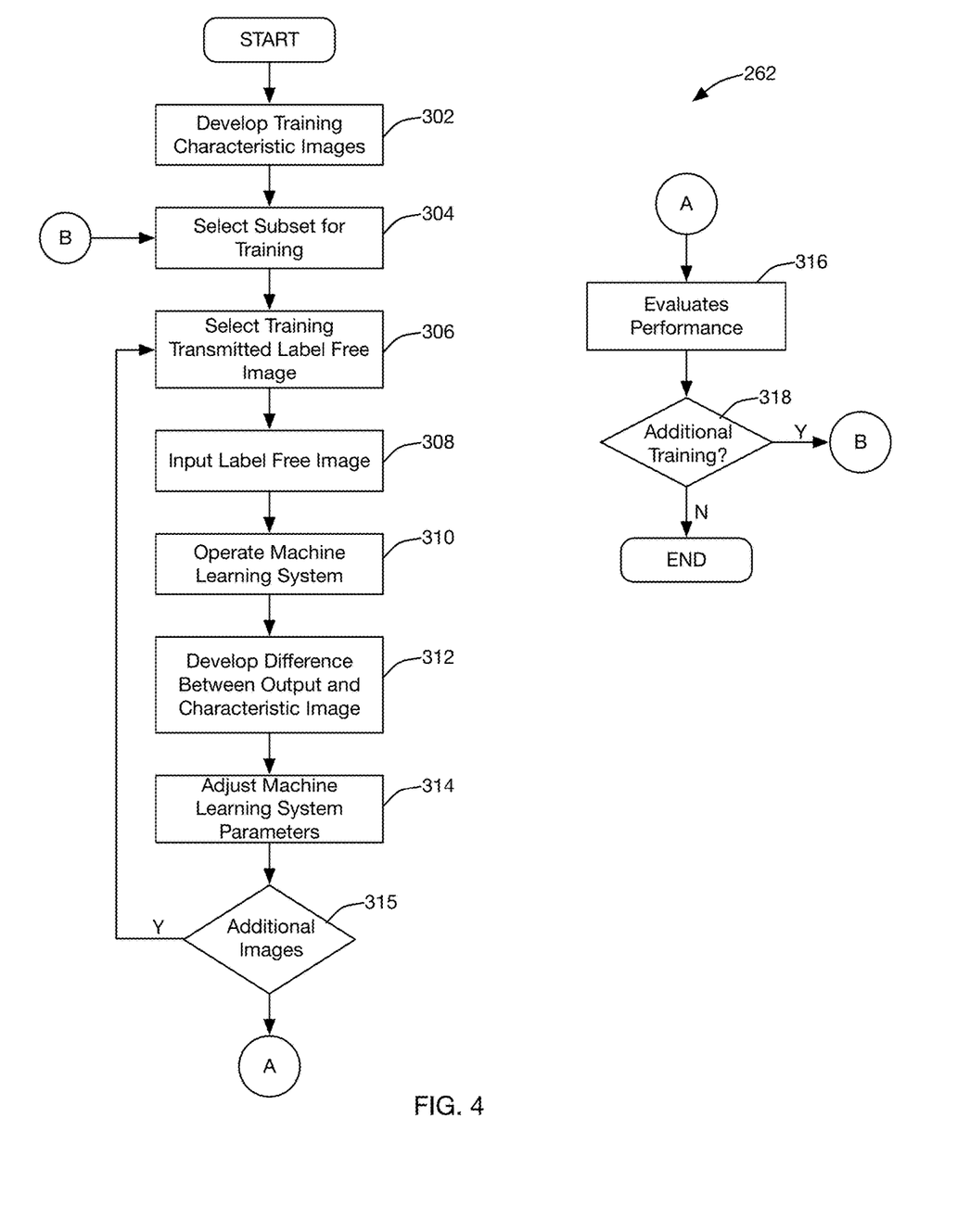
FIG. 4 is a flowchart that shows in further detail the steps undertaken by the training analysis system of FIG. 2 to train the machine learning system thereof.

FIG. 4 shows a flowchart of the steps the training and analysis system 200 undertakes during step 262 of FIG. 3 to train the machine learning system 206. Referring to FIG. 4, at step 302, the analysis module 210 generates from each fluorescent training image, a corresponding training characteristic image in accordance with the characteristic specified at step 252 (FIG. 3). In some embodiments, the training characteristic image generated includes one pixel for each pixel of the fluorescent training image from which such characteristic image is generated. In such embodiments, each such pixel indicates a likelihood that a corresponding pixel of the fluorescent training image is associated with the characteristic.

If the machine learning system 206 is being trained for segmentation, the training characteristic image is segmented using image processing techniques including boundary (edge) detection, boundary filling, peak detection, and combinations thereof. In some embodiments, each pixel of the segmented training characteristic image corresponds to a pixel of the fluorescent training image (and thus a pixel of the transmitted light image that is associated with the fluorescent training image) and, in some embodiments, has a value of either zero or one. A pixel of the segmented training characteristic image having a value of one indicates that the corresponding pixel of the fluorescent training image is associated with the selected characteristic. It should be apparent that other pixel values may be used to identify those pixels of the segmented training characteristic image that are associated with the selected characteristic from other pixels thereof. Thus, the segmented training characteristic image represents a plurality of training cell characteristics (e.g., live cells, dead cells, cells with particular organelles, particular types of cells, and the like).

At step 304, the training module 208 selects a first subset of the segmented training characteristic images. In some embodiments, the first subset is selected randomly. In other embodiments, the first subset is selected in accordance with a time of capture of the training label free or fluorescent image associated therewith or with an identifier associated with one or more sample tray(s) from which the fluorescent training image that resulted in the segmented training characteristic image was developed. It should be apparent to one of ordinary skill in the art that one or more other criterion/criteria may be used to select the first subset. At step 306, the training module 208 selects a first training transmitted light image associated with a first segmented training characteristic image, at step 308, presents the first training transmitted light image as input to the machine learning system 206, and, at step 310, operates the machine learning system 206, to generate a first plurality of predicted training characteristics. The first plurality of predicted training characteristics includes a predicted training characteristic that corresponds to each pixel of the first training transmitted light image and the value of such predicted training characteristic represents a probability that the corresponding pixel of the first training transmitted light image is associated with the characteristic.

At step 312, the training module 208 calculates an error value for each predicted training characteristic and a value of a corresponding pixel of the segmented training characteristic image for example using a loss function such as, for example, a weighted categorical cross entropy function. At step 314, the values of the errors are then used, for example using backpropagation, to adjust the parameters of the machine learning system 206, as would be understood by one who has ordinary skill in the art.

At step 315, the training module 208 determines if there are any images of the subset of images selected at step 304 that have not been used as an input to the machine learning system 206. If so, processing proceeds to step 306.

Otherwise, at step 316, the training module 208 evaluates the performance of the trained machine learning system 206. In particular, the training module 208 selects a second subset of the training characteristic images and a second subset of the training transmitted light images corresponding thereto. The training module 208 presents the second subset of training transmitted light images to the trained machine learning system 206. In response, for each image in the second subset, the trained machine learning system 206 generates a set of a plurality of training characteristic predictions, one such plurality for each second training transmitted light image presented to the trained machine learning system 206. A segmented training characteristic image is developed from each training fluorescent image associated with each transmitted light image of the second subset. A set of error values is calculated between each set of the plurality of training characteristic predictions and pixels of the segmented training characteristic image associated therewith. All of the sets of error values developed in this manner are combined into an aggregate error metric (e.g., percent of pixels associated with the characteristic that are identified accurately).

At step 318, the training module 208 compares the aggregate error metric to a predetermined acceptable error, and if the aggregate error metric is greater than the predetermined error, training module 208 proceeds to step 304 and selects a further subset of images for training as described above. In some embodiments, the training module 208 may display the aggregate error metric on the user computer 218 and query the operator of such computer whether to undertake further training. In other embodiments, the training module 218, also at step 318, determines whether to undertake additional training in accordance with a quantity samples that have been used for training, a quantity of iterations of training that have been undertaken, a rate of improvement in the aggregate error metric between success training passes, an amount of time undertaken for training, and other such conditions apparent to one who has ordinary skill in the art. If additional training is warranted, the training module 208 proceeds to step 304.

In some cases, the training module 208, at step 318, may determine that the aggregate error metric is greater the predetermined acceptable error but that additional training is not warranted (e.g., if the aggregate error metric is not improving). In such cases, the training module 218 may display the aggregate error metric on the user computer 218 with a message that such aggregate error metric is greater than the predetermined acceptable error and not undertake additional training.

Referring to FIGS. 2-4, if the training module 208, at step 318 (FIG. 4), determines that additional training of the machine learning system 206 is not warranted because the aggregate error metric is acceptable or because the aggregate error metric is not improving, then step 262 (FIG. 3) is completed and the training module proceeds to step 264 (FIG. 3) described above.

The steps 302-318 undertaken by the training and analysis system 200 and shown in FIG. 4 are described above for training the machine learning system 206 to segment and/or characterize one or more cells in transmitted light images. Substantially identical steps may be undertaken by the training and analysis system 200 to train the machine learning system 206 to generate a characteristic value when provided an image as input, wherein the characteristic value indicates a probability that the image includes a cell associated with the characteristic identified at step 252 of FIG. 3.

In particular, at step 302, instead of developing training characteristic images from fluorescent images, the analysis module 210 develops a characteristic value for each fluorescent image (or sub-image thereof) that indicates whether the fluorescent image includes a cell having the selected characteristic. For example, a characteristic value of one may indicate a presence of the characteristic and a characteristic value of zero may indicate absence of the characteristic. It should be apparent that other values may be used instead of one and zero to indicate the presence or absence, respectively, of the characteristic. Instead of using segmented training characteristics at steps 310-314 to train the machine learning system 206, the training module 208 uses the characteristic value. Further, instead of using images having a plurality of cells, the training and analysis system 200 may be configured to generate overlapping or adjacent tiled images from images obtained at steps 256 and 258 (FIG. 3). Such tiling may be undertaken, for example, by the image acquisition module 202 or the analysis module 210. In some embodiments, each image may be divided into tiles that have dimensions of, for example, 32 pixels by 32 pixels, wherein each tile duplicates some pixels, e.g. 8 pixels in each direction, of adjacent tiles. It should be apparent that tiles of other dimensions and having different amounts of duplicate pixels may be used. In other embodiments, the dimensions of the tiles may be selected in accordance with the expected number of pixels a cell or another portion of interest of the biological sample is expected to occupy.

Figure 5:
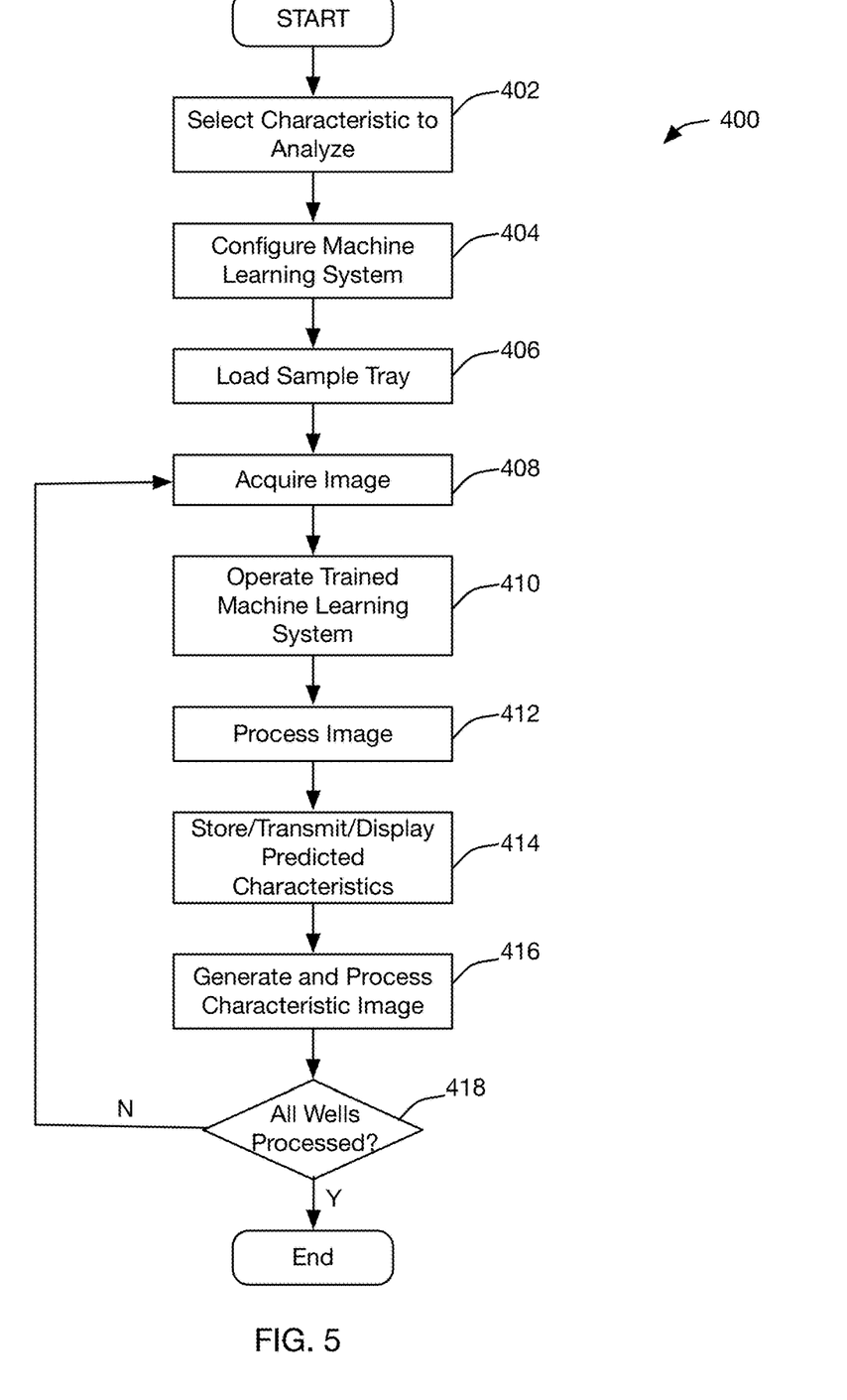
FIG. 5 is a flowchart that shows the steps undertaken by the training and analysis system of FIG. 2 to analyze an image of a biological sample using a machine learning system trained in accordance with the flowcharts shown in FIGS. 3 and 4.

FIG. 5 shows a flowchart 400 of the steps the system 200 undertakes to use the trained machine learning system 206 to measure characteristics of one or more biological sample(s). Referring to FIG. 5, at step 402, a measurement module 214 receives from the user computer 218 a selection of a characteristic to measure in a biological sample, and optionally an identification of the types of cells that comprise the biological sample. In some embodiments, at step 402, the measurement module 214 displays on the user computer 218 a list of one or more characteristic(s) and/or types of cells for which machine learning parameter(s) have been developed and stored in the parameters data store 212. That is, the list indicates the cell characteristic(s) and/or cell type(s) that machine learning system(s) 206 have been trained to identify in label free images of biological samples.

In response, the measurement module 214 receives from the user computer 218 a selection of one such characteristic and/or cell type, also at step 402.

At step 404, the measurement module 214 selects the parameters in the parameters data store 212 that resulted from and were stored after training the machine learning system 206 to analyze the selected characteristic in the identified types of cells. Thereafter, the measurement module 214 configures the machine learning system 206 with the selected parameters to return the machine learning system 206 to a trained state.

At step 406, a sample tray 116 with the biological sample deposited in the wells 118 thereof is loaded on the X-Y stage 102. At step 408, the image acquisition module 202 directs the imaging system 100 to generate a transmitted light image of a well 118, or a portion thereof. The transmitted light image is then presented to the trained machine learning system 206 as an input at step 410 and, in response, the trained machine learning system 206 produces a plurality of predicted cell characteristics. As described above, a value of each of the plurality of predicted cell characteristics indicates a probability that a corresponding pixel of the transmitted light image is associated with the characteristic, and thus the portion of the biological sample represented in such pixel of the transmitted light image is also associated with the characteristic.

In some embodiments, at step 412, the output processing module 216 undertakes additional operations to cleanse the predicted cell characteristics. Such cleansing operations involve applying image processing techniques apparent to those who have skill in the art including boundary filling, edge detections, and the like. Using such image processing techniques, the output processing module 216 may adjust characteristic values that are associated with pixels of the transmitted light that represent edges of cells to make such edges more apparent, remove adjacent characteristic values that represented objects in the transmitted light image that are too large (or too small) to be a single cell, and remove characteristic values associated with pixels in the transmitted light image associated with spurious content. Other types of cleansing operations apparent to one of ordinary skill in the art may be undertaken at step 412.

In some embodiments, at step 414, the measurement module 214 stores the plurality of predicted cell characteristics generated at step 410 in a data store (not shown), transmits such plurality to another system for further analysis, or displays such plurality on the user computer 218.

In some embodiments, the measurement module 214 may generate a characteristic image from the values of the plurality of predicted cell characteristics generated at step 410 at step 416. Each pixel of the characteristic image corresponds to a pixel of the transmitted light image. In some embodiments, a pixel of the characteristic image is set to a predetermined non-zero value if a corresponding predicted cell characteristic exceeds a predetermined threshold and zero otherwise. In other embodiments, the value of the pixel of the characteristic image is set in accordance to a value of the corresponding predicted cell characteristic. For example, the measurement module 214 may set a value of a pixel of the characteristic image to a particular color associated with the probability that the corresponding pixel in the transmitted light image is associated with the characteristic. In some cases, the measurement module 214 may automatically develop one or more metric(s) from the characteristic image such as, for example, a count of the number of cells or portions thereof represented in the transmitted light image have at least a predetermined probability of being associated with the characteristic. Automatically developing such metric(s) may involve applying boundary or edge detection, boundary filling, and similar algorithms to the characteristic image generated at step 416. In some embodiments, the operator selects, for example, from a list, the metrics the measurement module 214 calculates. In other embodiments, the measurement module 214 may be preconfigured to calculate particular metrics. Other ways of selecting the metrics calculated by the measurement module 214 apparent to those who have skill in the art may be used. In some embodiments, the characteristic image may be used to generate a mask that is applied to the transmitted light image to isolate images of cells therein that are associated with the characteristic. Additional processing may be undertaken on the characteristic image including, for example, local thresholding, competitive growing, boundary growing, and the like.

Returning to FIG. 5, at step 418, the measurement module 214, determines if all of the wells 118 of the sample tray 116 that have a biological sample deposited therein have been processed, and if so, the measurement module 214. Otherwise, the training and analysis system 100 proceeds to step 408 to acquire and analyze additional transmitted light images.

It should be apparent to one of ordinary skill in the art, that the predicted characteristic values developed at step 410 may simply be a single characteristic value as described above. In such cases, the characteristic value may be thresholded or otherwise processed at step 412, and step 416 may not need to be undertaken.

Figure 6:
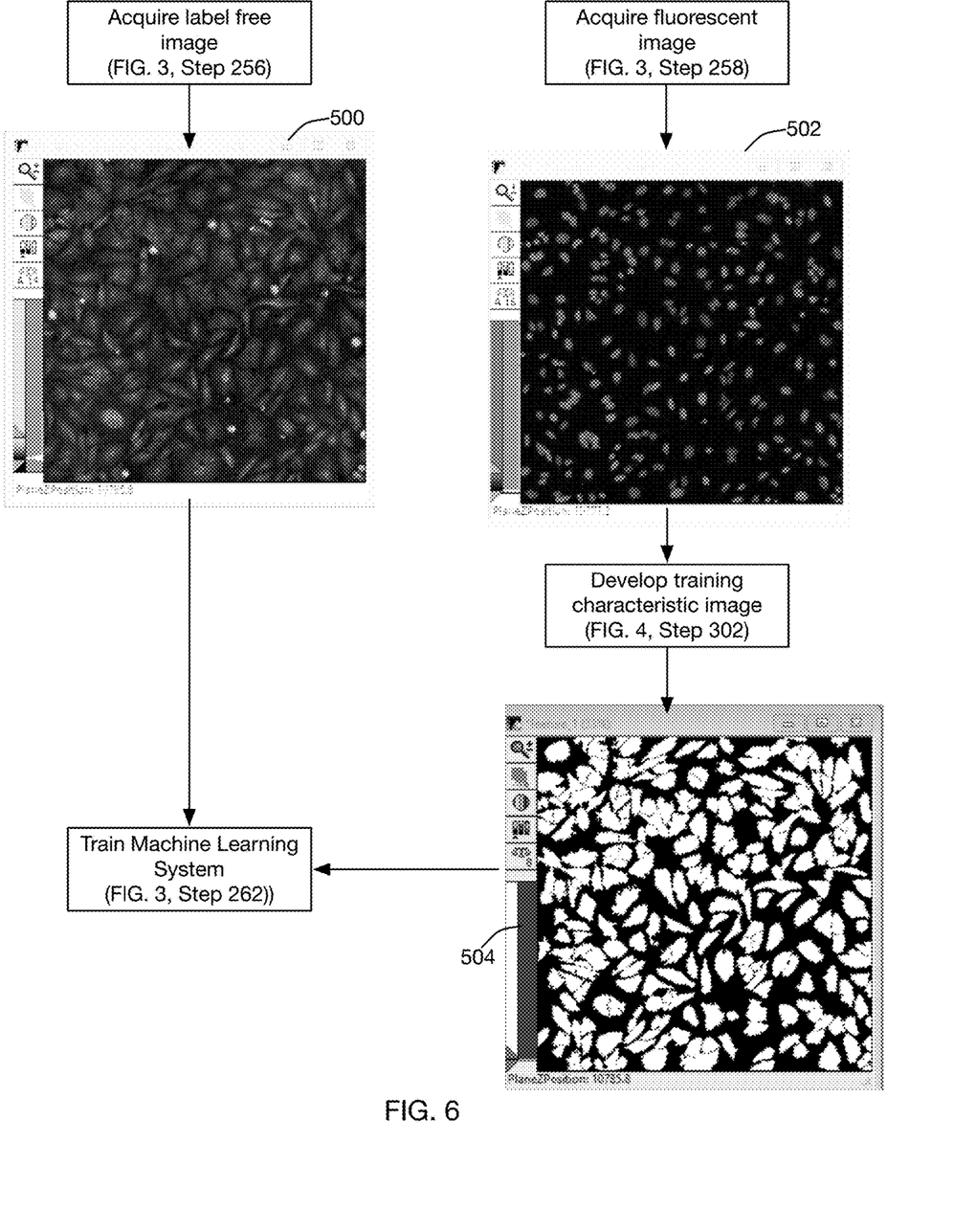
FIG. 6 is an example of a process flow of training a machine learning system of the training and analysis system of FIG. 2.

FIG. 6 shows an example of a process flow of training the machine learning system 206 of the image training and analysis system 200 as described above. Referring to FIGS. 2-6, a training transmitted light (i.e., label free) image 500 of a biological sample is acquired by the image acquisition module 202 (FIG. 2) at step 256 (FIG. 3) and a fluorescent image 502 of the biological sample is acquired by the image acquisition module 202 at step 258 (FIG. 3). A training characteristic image 504 is generated by the analysis module 210 (FIG. 2) at step 302 (FIG. 4). As described above, the training transmitted light image 500 and the training characteristic image 504 are then used by the training module 208 to train the machine learning system 206, at step 262 (FIG. 3).

Figure 7:
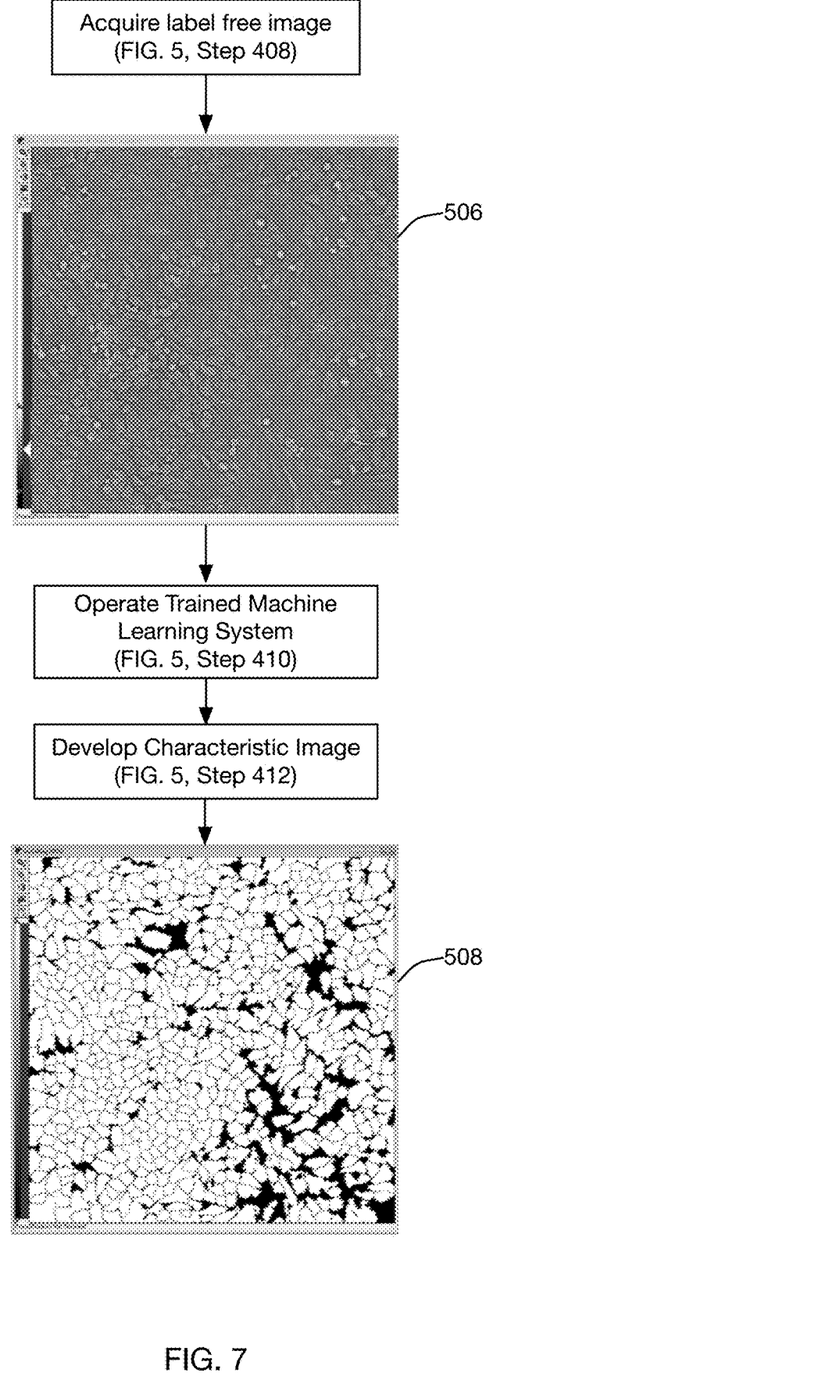
FIG. 7 is an example of a process flow of operating a trained machine learning system of the training and analysis system of FIG. 2.

FIG. 7 shows an example of a process flow of using the trained machine learning system 206. Referring to FIGS. 2-7, an input transmitted light image 506 is acquired by the image acquisition module 202 at step 408 (FIG. 5) that is supplied as an input to the trained machine learning system 206 at step 410 (FIG. 5). The output from the trained machine learning system 206 is then used to develop a characteristic image 508 by the output processing module 216 (FIG. 2) at step 412 (FIG. 5).

Referring once again to FIG. 2, in some embodiments the machine learning system 206 is a convolutional neural network that has an input layer that accepts as input a 64×64 transmitted light image, and in response generates a 64×64 output image. In some embodiments, the neural network 206 is configured using AutoML and NASNet technologies developed by Google Inc. of Mountain View, Calif. It should be apparent that other neural network 206 technologies known to those who have skill in the art may be used including, for example, a fully convolutional DenseNet, neural networks optimized for machine vision applications, and the like. It should be apparent that the machine learning system 206 may be another type of machine learning system including a random forest tree and the like.

Although, the training and analysis system 200 described in the foregoing is described as being used to train the machine learning system 206 to analyze individual two-dimensional transmitted light image, such training and analysis system 200 may be adapted to train the machine learning system 206 to analyze a series of two-dimensional transmitted light images of a biological sample taken at different focal points that represent a three-dimensional representation of such biological sample. In such embodiments, the machine learning system 206 is trained using a series of training transmitted light images and a series of training fluorescent light images, wherein all images comprising such series are associated with a substantially identical X-Y location of the sample carrier 116, and the corresponding transmitted light and fluorescent images of the series are associated with a different focal point (i.e., different Z location). All of the images that comprise a series are simultaneously provided to the machine learning system 206 and the machine learning system 206 generates either a characteristic value that indicates that a cell having a predetermined characteristic is represented by the series transmitted light image, or a set of predicted characteristic values. If the set of predicted characteristic values if generated, such set includes one value associated with each pixel of the transmitted light images and such value indicates a probability that such pixel is associated with the characteristic. Thus, the set of predicted characteristic values may be used to segment in three-dimensions an input series of label-free images.

Referring to FIGS. 1 and 2, it should be apparent to one of skill in the art that a first imaging system 100 may be used to supply the label free and fluorescent images used to train a first untrained machine learning system 206 to develop a first trained machine learning system 206, and the parameters associated with the first trained machine learning system 206 may be stored in the parameters data store 212. Thereafter, such stored parameters may be used to configure a second untrained machine learning system 206 to develop a second trained machine learning system 206 (i.e., replicate the capabilities of the first trained machine learning system 206 on the second untrained machine learning system 206). The second trained machine learning system 206 may be used to analyze one or more label free image(s) generated using the first or the second imaging systems 100. Further, because fluorescent images are not necessary when operating the first or second trained imaging systems 100, it should be apparent that the second imaging system 100 need only generate label free images and, in fact, may not even be equipped to generate fluorescent images.

It should be apparent to those who have skill in the art that any combination of hardware and/or software may be used to implement the training and analysis system 200 described herein. It will be understood and appreciated that one or more of the processes, sub-processes, and process steps described in connection with FIGS. 1-5 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-5. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the image acquisition module 202, the machine learning system 206, the training module 208, the analysis module 210, and the measurement module 214, and the processing module 216 of FIG. 2), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

It should be apparent to one who has skill in the art that one or more components of the image training and analysis system 200 may operate in a cloud environment, for example, using distributed computing and storage systems connected over a local or wide area network (e.g., the Internet or a private network). For example, one or more of the image acquisition module 202, the machine learning system 206, the training module 208, the output processing module 216, and the measurement module 214 may operate on one or more computer(s) remote from the user computer 218, the imaging system 100, and/or one another. In one such configuration, for example, the image acquisition module 202 may communicate with the controller 114 over the local or wide area network to acquire images from the imaging system 100 and store images acquired in this manner in a cloud-based image store 204. The training module 208 operating locally or in the cloud may access such images to train the machine learning system 206 and store the parameters in the parameters data store 212, which may be also be a cloud-based storage system. The measurement module 214 (operating on a local server or in the cloud environment) may access the parameters stored in the parameters data store 212 to train an untrained machine learning system 206 (operating on a local computer or in the cloud environment). Similarly, operation of the machine learning system 206 may be undertaken to analyze images acquired using a local or remote imaging system 100.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

We claim:

1. A method of analyzing a biological sample using an imaging system comprising the step of:
    causing a programmable device to undertake the steps of:
        instructing the imaging system to obtain a label free image of a biological sample, and in response receiving the label free image;
        instructing the imaging system to cause the biological sample to fluoresce and obtain a fluorescent image of the biological sample undergoing fluorescence, and in response receiving the fluorescent image;
        analyzing the fluorescent image to generate a segmented image, wherein a value of each pixel of the segmented image indicates whether a corresponding pixel of the label free image is associated with a particular characteristic; and
        training a machine learning system using the label free image and the segmented image to develop a trained machine learning system such that when the trained machine learning system is operated with the label free image as an input, the trained machine learning system generates a plurality of predicted cell characteristics, wherein each predicted cell characteristic of the plurality of predicted cell characteristics corresponds to a pixel of the label free image and a value of the predicted cell characteristic indicates a probability that the pixel is associated with the particular characteristic.

2. The method of claim 1, wherein the programmable device iteratively undertakes the step of training the machine learning system until a difference between each of the plurality of predicted cell characteristics and a corresponding pixel of the segmented image is within a predetermined amount.

3. The method of claim 1, wherein the biological sample comprises a first biological sample, the label free image comprises a first label free image, and the plurality of predicted cell characteristics comprises a first plurality of predicted cell characteristics and further causing the programmable device to undertake the steps of receiving a second label free image of a second biological sample, operating the trained machine learning system with the second label free image as an input, and in response receiving a second plurality of cell characteristics, wherein each one of the second plurality of predicted cell characteristics indicates whether a corresponding pixel of the second label free image is associated with the particular characteristic.

4. The method of claim 3, wherein causing the programmable device to undertake the step of receiving the second plurality of predicted cell characteristics comprises the step of receiving a cell characteristic for each pixel of the second label free image.

5. The method of claim 3, wherein the programmable device undertakes the further step of processing the second plurality of predicted cell characteristics to develop metrics associated with the second label free image.

6. The method of claim 5, wherein the metrics comprise a count of one of a number of live cells, dead cells, particular organelles, and particular types of cells represented in the second label free image.

7. The method of claim 1, wherein the trained machine learning system comprises a first trained machine learning system and the programmable device comprises a first programmable device, and further including the step of causing the first programmable device to undertake the further step of storing parameters associated with the first trained machine learning system, and causing a second programmable device to undertake the step of configuring an untrained machine learning system with the stored parameters to develop a second trained machine learning system.

8. The method of claim 1, wherein the biological sample comprises a first biological sample, the label free image comprises a first label free image, the programmable device comprises a first programmable device, and the plurality of predicted cell characteristics comprises a first plurality of predicted cell characteristics, and the method includes causing a second programmable device remote from the first programmable device to undertake the steps of receiving a second label free image of a second biological sample, and causing the first programmable device to undertake the step of operating the trained machine learning system with the second label free image as an input and in response receiving a second plurality of predicted cell characteristics, wherein each one of the second plurality of predicted cell characteristics indicates if a corresponding pixel of the second label free image is associated with the particular characteristic.

9. The method of claim 1, wherein causing the programmable device to train the machine learning system includes undertaking the step of training the machine learning system to analyze a particular type of biological sample for the particular characteristic.

10. The method of claim 1, wherein the label free image is one of a series of label free images that represent a three-dimensional representation of the biological sample, and further including causing the non-transitory programmable device to train the machine learning system includes simultaneously providing all of the series of label free images to the machine learning system as an input.

11. A system for analyzing a biological sample using an imaging system comprising:
a machine learning system operating on at least one programmable device;
an image acquisition module operating on the at least one programmable device that instructs the imaging system to generate a label free image of a biological sample, and in response receives the label free image, and instructs the imaging system to cause the biological sample to fluoresce and obtain a fluorescent image of the biological sample undergoing fluorescence, and in response receives the fluorescent image;
an analysis module operating on the at least one programmable device that analyzes the fluorescent image to generate a segmented image, wherein a value of each pixel of the segmented image indicates whether a corresponding pixel of the label free image is associated with a particular characteristic; and
a training module operating on the at least one programmable device that trains the machine learning system using the label free image and the segmented image to develop a trained machine learning system such that when the trained machine learning system is operated with the label free image as an input, the trained machine learning system generates a plurality of predicted cell characteristics, each predicted cell characteristic of the plurality of cell characteristics corresponds to a pixel of the label free image, and a value of the predicted cell characteristic indicates a probability that the pixel is associated with the particular characteristic.

12. The system of claim 11, wherein the training module iteratively undertakes the step of training the machine learning system until a difference between each of the plurality of predicted cell characteristics and a corresponding pixel of the segmented image is within a predetermined amount.

13. The system of claim 11, wherein the biological sample comprises a first biological sample, the label free image comprises a first label free image, and the plurality of predicted cell characteristics comprises a first plurality of predicted cell characteristics and the image acquisition module receives a second label free image of a second biological sample and a measurement module operating on the at least one programmable device operates the trained machine learning system with the second label free image as an input, and in response receives a second plurality of predicted cell characteristics, wherein each one of the second plurality of cell characteristics indicates whether a corresponding pixel of the second label free image is associated with the particular characteristic.

14. The system of claim 13, wherein the measurement module operates on a first one of the at least one programmable device that is remote from at least another one of the non-transitory programmable device on which the machine learning system, the image acquisition module, the analysis module, and the training module operate.

15. The system of claim 13, wherein the second plurality of predicted cell characteristics comprises a predicted cell characteristic associated with each pixel of the second label free.

16. The system of claim 13, wherein the measurement module processes the second plurality of predicted cell characteristics to develop metrics associated with the second label free image.

17. The system of claim 11, wherein the biological sample comprises a first biological sample, the label free image comprises a first label free image, the plurality of predicted cell characteristics comprises a first plurality of predicted cell characteristics, the at least one programmable device includes a first programmable device and a second programmable device, and the trained machine learning system includes a first trained machine learning system operating on the first programmable device, and further including a further image acquisition module and a measurement module operating on the second programmable device, wherein the training module stores parameters associated with the first trained machine learning system, the measurement module configures an untrained machine learning system with the stored parameters to develop a second trained machine learning system, wherein the further image acquisition module receives a second label free image of a second biological sample and the measurement module operates the second trained machine learning system with the second label free image as an input and, in response receives a second plurality of predicted cell characteristics associated with the second label free image.

18. The system of claim 11, wherein the machine learning system comprises a convolutional neural network.

19. The system of claim 11, wherein the training module trains the machine learning system to analyze a particular type of biological sample for the particular characteristic.

20. The system of claim 11, wherein the label free image is one of a series of label free images that represent a three-dimensional representation of the biological sample, and the training module trains the machine learning system by simultaneously providing all of the series of label free images to the machine learning system as an input.

* * * * *